United States Patent [19]

Gaveske

[11] Patent Number: 5,576,062
[45] Date of Patent: Nov. 19, 1996

[54] CHEMICALLY RESISTANT COATING FOR CONCRETE AND MASONRY STRUCTURES

[75] Inventor: John H. Gaveske, Shakopee, Minn.

[73] Assignee: Polywall International, Inc., White Bear Lake, Minn.

[21] Appl. No.: 507,007

[22] Filed: Jul. 25, 1995

[51] Int. Cl.$^6$ ................ B05D 5/00; C09K 3/00
[52] U.S. Cl. .............. 427/385.5; 106/2; 427/230; 427/393.6
[58] Field of Search ............... 106/2, 271, 285; 427/385.5, 393.6, 230; 524/435

[56] References Cited

U.S. PATENT DOCUMENTS

| | | |
|---|---|---|
| 2,470,918 | 7/1942 | Chung ................. 117/123 |
| 2,491,487 | 12/1949 | Faulwetter ................. 117/63 |
| 3,423,224 | 1/1969 | Schmidt et al. ................. 117/2 |
| 3,660,214 | 5/1972 | Nichols, Jr. et al. ................. 161/38 |
| 3,721,640 | 3/1973 | Wilheim et al. ................. 156/331.4 |
| 3,814,619 | 6/1974 | Kobayashi et al. ................. 117/62 |
| 3,854,985 | 12/1974 | Suzuki et al. ................. 427/428 |
| 3,861,944 | 1/1975 | Steinberg et al. ................. 138/145 |
| 3,929,692 | 12/1975 | Offerman ................. 524/44 |
| 3,967,012 | 6/1976 | Ebner ................. 427/380 |
| 4,064,092 | 12/1977 | Burroway et al. ................. 524/376 |
| 4,141,737 | 2/1979 | Moon et al. ................. 106/12 |
| 4,379,857 | 4/1983 | Hansen et al. ................. 521/54 |
| 4,403,059 | 9/1983 | Laut et al. ................. 524/399 |
| 4,435,472 | 3/1984 | Leah ................. 428/333 |
| 4,474,833 | 10/1984 | Maxfield ................. 427/138 |
| 4,478,912 | 10/1984 | Uffner et al. ................. 428/349 |
| 4,482,382 | 11/1984 | Kanayama et al. ................. 106/90 |
| 4,489,109 | 12/1984 | Puskar ................. 427/230 |
| 4,507,365 | 3/1985 | Lower et al. ................. 428/489 |
| 4,536,417 | 8/1985 | Shimizu ................. 427/140 |
| 4,537,921 | 8/1985 | Uffner et al. ................. 524/59 |
| 4,562,109 | 12/1985 | Harvey et al. ................. 428/220 |
| 4,582,730 | 4/1986 | Elser et al. ................. 427/393 |
| 4,714,507 | 12/1987 | Ohgushi ................. 156/91 |
| 4,804,693 | 2/1989 | Harvey et al. ................. 523/219 |
| 4,937,033 | 6/1990 | Oshio et al. ................. 264/256 |
| 5,124,182 | 6/1992 | Kubo et al. ................. 427/393.6 |

FOREIGN PATENT DOCUMENTS

| | | |
|---|---|---|
| 2029243 | 12/1971 | Germany ................. 106/2 |
| 50-21020 | 3/1975 | Japan . |
| 62-210076 | 9/1987 | Japan . |
| 5-163837 | 6/1993 | Japan . |
| 914605 | 3/1982 | U.S.S.R. . |

OTHER PUBLICATIONS

Degussa Corporation, Technical Bulletin Pigments, "Aerosil® as a Thickening Agent for Liquid Systems", No. 23, 1–36 (Jul. 1989).

Degussa Corporation, Technical Bulletin, Pigments, "Aerosil® for Lacquers and Paints Systems", No. 68, 1–24 (May 1986).

DuPont Chemicals, "Tetrahydrofuran: Properties, Uses, Storage, and Handling", 1–26 (Dec. 1991).

DuPont Chemicals, "Material Safety Data Sheet, Tetrahydrofuran", (Mar. 1992).

Discover™, Monthly Report (Oct. 1992).

Polymer Technology, Chapter 11, "Polystyrene and Copolymers", Chemical Publishing Inc., New York, N.Y., 284–317 (1979) No Month Given.

*Primary Examiner*—Anthony Green
*Attorney, Agent, or Firm*—Merchant, Gould, Smith, Edell, Welter, & Schmidt

[57] ABSTRACT

A novel coating for waterproofing and sealing a sewage system structural unit using a styrene polymeric film cast from an organic solvent is disclosed. The coating is easily maintained as damaged areas and imperfections can be repaired by simply applying additional liquid composition to the damaged area, and the liquid composition remelts the existing film allowing the newly formed film to be continuous. In addition, the composition can be applied to structural units in sub-freezing temperatures or to wet surfaces. Novel methods relating to the use of the liquid, chemically resistant coating composition are also disclosed including application to concrete and masonry units used in sewage systems.

10 Claims, No Drawings

CHEMICALLY RESISTANT COATING FOR CONCRETE AND MASONRY STRUCTURES

FIELD OF THE INVENTION

This invention relates generally to the field of waterproofing and sealing rigid structures. In particular, the invention relates to a method of waterproofing and sealing a rigid structural unit used in sewage systems using a chemical resistant styrene polymeric film cast from an organic solvent.

BACKGROUND OF THE INVENTION

Masonry structures are porous and are susceptible to cracking due to distortion caused by movement of their foundation, vibration, and/or drying out subsequent to their construction. In addition, below grade structures are often subjected to hydrostatic pressure from ground water. Therefore, waterproofing and sealing below grade masonry structures have been major concerns for a number of years. Masonry structures have been coated with various tar-based and asphaltic compositions. These compositions are relatively inexpensive and can be applied year-round if heated to a pliable state. However, these compositions generally contain leachable components which can contaminate the surrounding soil. In addition, these compositions contain substantial amounts of organic materials which are attacked by soil- and water-borne microorganisms and have a short useful life before decomposition of substantial pathways through the coatings.

The problem of waterproofing and sealing is even more acute when dealing with sewage systems that contain concrete units such as sewage tanks, clarification tanks and pipes. A coating for sewage systems not only must provide effective waterproofing and sealing but must be able to withstand chemical attack to maintain its effectiveness. Noxious gases, e.g. ozone, methane, hydrogen sulfide and the like, as well as strong acids, e.g. sulfuric acid and the like, microorganisms, caustic and other noxious sewage degradation products can attack a coating and destroy its effectiveness.

The only effective coating used for concrete structural units at present is polyvinyl chloride sheeting. The waterproofing/sealing systems based on polyvinyl sheeting generally have open seams and generally require black mastics or metal fasteners such as nails, etc., to adhere the sheeting to the masonry or concrete surfaces. The sheets are usually UV-sensitive and can be susceptible to fungus and insect attack. In addition, the sheets are difficult to form around non-uniform surfaces, e.g. at the joints, where plastic welding may be required, and the nails puncture the sheet and may puncture cement blocks to provide a direct water channel into the interior of the block wall. In some instances where pre-molded polyvinyl chloride is used, the concrete must be poured around the mold; i.e. the coating is placed only during the building of the structural unit.

Beyond the problems discussed above, the state of the art coating compositions are generally fragile, and they must be protected during backfilling of earth around the masonry structures. Without such protection, the sheets or coatings can be ruptured, torn, pulled down along vertical surfaces by the backfill, etc. Further, many of these coating systems require that the masonry structure be dry or contain only a trace of dampness which requires careful protection of the structure before application of the waterproofing/sealing system.

Therefore, a new, low cost, waterproof and chemically resistant sealant is needed for use in waterproofing applications for concrete sewage units which is durable and has a long effective life span. In addition, a new method of waterproofing and sealing and structures is needed which is useful year round, even in northern latitudes, and which can be applied more conveniently to wet masonry or concrete surfaces.

SUMMARY OF THE INVENTION

To overcome the deficiencies in the current methods of waterproofing and sealing rigid structural units, a new procedure has been developed. The procedure includes the steps of applying a liquid coating composition to the structural unit, and drying the liquid composition to form a film having an average water vapor permeability of less than about $1*10^{-2}$ perms-inch. The liquid coating composition is a styrene polymeric resin in an organic solvent.

The procedure can also include the step of filling defects in the structural unit with a liquid composition comprising the above polystyrene resin binder and portland cement in an organic solvent. This particular liquid composition is very compatible with the liquid waterproofing/sealing composition, and it can be covered with the waterproofing/sealing composition with little delay.

The procedure is operable over a wide range of temperatures, from well below freezing to in excess of 100° F., and to surfaces which are wet or dry. Further, the resulting coating is tough, and adheres strongly to the concrete or masonry structure. In addition, the waterproofing/sealing composition rapidly dries to a coating layer which can be backfilled without any protective devices or layers.

It has also been discovered that the present waterproofing coating is chemically resistant. The coating can thus be used to waterproof above and below grade masonry or concrete structures used in sewage systems, e.g. tanks, pipes, and the like. Such coating not only provides waterproofing, but also includes excellent resistance to noxious gases, e.g. ozone, methane, $H_2S$, acids, e.g. sulfuric and the like, and other damages caused by microorganisms and liquids in addition to water.

Accordingly one aspect of the present invention includes a method of waterproofing and sealing a sewage system structural unit employing the steps of:

(a) applying to at least one surface of the unit a liquid, chemically resistant composition in an aromatic hydrocarbon solvent vehicle comprising:

(i) about 100 parts by weight of a binder resin comprising about 35–95 wt-% polystyrene and the remainder of a polymer selected from the group consisting of a styrene-butadiene rubber, polybutene rubber, chlorinated rubber, chlorinated sulfonated polyethylene rubber, chlorinated paraffin and a mixture thereof, and (ii) about 1 to 25 parts by weight of binder resin of an iron oxide; and (b) solidifying the liquid composition to form a continuous film.

Another aspect of the present invention is a waterproofing, chemically resistant coating composition useful for sewage structural units which include:

(a) a major portion of an aromatic hydrocarbon solvent;

(b) about 100 parts by weight of a binder resin comprising about 35–95 wt-% polystyrene and the remainder a polymer selected from the group consisting of a styrene-butadiene rubber, polybutene rubber, chlorinated rubber, chlorinated sulfonated polyethylene rubber, chlorinated paraffin, and a mixture thereof, and (c) about 1 to 25 parts by weight of binder resin of an iron oxide.

The composition forms a film which binds to the unit and has an average water vapor permeability of less than about $1*10^{-2}$ perms-inch.

As used herein the specification and the claims, the phrase "a rigid structural unit" is intended to include the following, non-limiting list of rigid structural materials such as metal, stone and stone products, concrete and concrete products, composite materials, brick, tile, terra-cotta, and the like. In addition, the term "masonry" is intended to include the following, non-limiting list of inorganic materials such as stone and stone products, concrete and concrete products, clay products, brick, tile, terra-cotta, and the like.

DETAILED DESCRIPTION OF THE INVENTION

Rigid Structural Units

The present invention is useful in methods for protecting above ground or subterranean masonry and concrete structures that are susceptible to chemical attack, e.g. sewage systems, and systems used in the pulp and paper industry. These masonry or concrete structures may be tanks, pipes walls, retaining walls, cement posts, and the like. The structures may include poured concrete, block and mortar, and the like. The masonry structures may ultimately be completely buried, or may be partially exposed to the atmosphere. The masonry structures may or may not comprise reinforcing bars, rod, mesh, and the like. Basically, the invention is useful to waterproof structures which are less flexible than the coating itself. In other words, if the waterproof coating which results from the application of the liquid coating composition is slightly more flexible and elastic than the surface to be coated, the movement of that surface after application of the coating will not cause cracks in the coating. Therefore, the coating will remain an effective water barrier.

In one embodiment, the masonry structure comprises sewage tanks and pipes formed in excavations in the earth, and may be built under diverse weather and temperature conditions. Generally, the structures are exposed to all weather conditions prior to burying, backfilling or other protection.

The structures may also have defects which require filling prior to coating. Such defects can be cracks and fissures, and they can be a result of concrete form ties, cold joints in concrete, and the like.

Waterproofing/Sealing Coating Composition

The liquid coating composition comprises a styrene polymeric resin binder in an aromatic hydrocarbon. In a preferred embodiment, the liquid coating composition is combination of about 100 parts by weight of a binder resin comprising a styrene polymer; about 150 to 400 parts by weight of an organic solvent; about 0 to 50 parts by weight of a plasticizer; about 0 to 200 parts by weight of a filler; and about 1 to 25 parts by weight of a particulate solid, an iron oxide.

The resin binder may be a styrene homopolymer (polystyrene), a copolymer including styrene, a mixture of polystyrene and one or more polymers, or a combination of the above. The styrene copolymer may comprise a styrene and a rubbery diene co-monomer including isoprene, butadiene, and the like, or it may comprise co-monomers such as acrylonitrile, acrylates, olefins such as butylene, and the like. These copolymers may be random or block copolymers. The styrene polymeric resin can be a general purpose grade, crystalline, high impact, or medium impact grade of polystyrene. Increasing amounts of styrene copolymers such as styrene-butadiene and styrene-isoprene tend to increase the difficulty in completely dissolving the binder resin, but it is possible to use high impact polystyrene and medium impact polystyrene resins in the present invention. Preferably, the styrene resin comprises a general purpose grade or medium impact grade of polystyrene.

The above polystyrene is mixed with rubbery polymers to form the binder resin. Such rubbery polymers include, for example, unvulcanized natural rubber, chlorinated natural rubber, chlorinated sulfonated polyethylene rubber, styrene-butadiene rubber, polybutene rubber, chlorinated paraffin, and mixtures thereof.

Preferably the styrene resin forms about 50–75 wt-% of the polymeric binder resin, and most preferably, about 69–71 wt-% of the polymeric binder resin.

The styrene polymeric resin used in the present invention may be modified by plasticizers, coupling agents, and the like. Such modified resins include high impact polystyrene such as styrene-butadiene modified high impact and medium impact polystyrene.

The resin binder may be virgin resin, regrind resin, recycled resins, or a mixture thereof. Again, the styrene polymeric resin is mixed with other resins such as styrene-butadiene rubbers, and the like as mentioned above, to provide the chemical resistance and increase the toughness of the resulting film.

Preferably, the resin binder is a styrene polymeric resin having at least 85 wt-% styrene homopolymer. More preferred, the styrene polymeric resin is a general purpose grade polystyrene, which may be clear virgin resin, reground resin or recycled resin. Most preferably, the resin binder comprises clear reground or recycled general purpose grade polystyrene resin.

For purposes of application on sewage structural units, a particularly preferred coating has provided excellent sealing results not only with regard to waterproofing but also with regard to chemical resistance. This composition comprises a resin binder having from about 35–95 wt-% styrene homopolymer in a mixture with a polymer selected from the group consisting of a styrene-butadiene rubber, polybutene rubber, chlorinated rubber, chlorinated sulfonated polyethylene rubber, chlorinated paraffin, and a mixture thereof, as described above. A particularly preferred rubber polymer is the use of a mixture of polybutene rubber, chlorinated rubber, chlorinated sulfonated polyethylene rubber and chlorinated paraffin.

About 100 parts by weight of the resin binder is dissolved in a suitable aromatic hydrocarbon solvent in order to carry the coating components uniformly through the composition. The amount of solvent used may be selected by the formulator of the liquid composition in order to provide the desired amount of solids, thickness, drying time, etc., in the formulated composition. Preferably, the solvent is present at about 150 to 400 parts by weight, more preferably, at about 180 to 350 parts by weight, and most preferably at about 250 to 300 parts by weight. Persons skilled in the art will be able to easily select an appropriate solvent for the particular binder resin used. Some solvents which are commonly used include benzene, toluene, xylene, chlorobenzene and ethylbenzene. Preferred solvents include toluene and xylene. Most preferred as a solvent is xylene.

The plasticizer may be liquid or solid, and is preferably present in an amount sufficient to increase the toughness and flexibility of the film coating. The film coating is more flexible and elastic than the masonry structure substrate. A non-limiting list of useful plasticizers for the present invention include butyl stearate, dibutyl maleate, dibutyl phthalate, dibutyl sebacate, diethyl malonate, dimethyl phthalate, dioctyl adipate, dioctyl phthalate, butyl benzyl phthalate, benzyl phthalate, octyl benzyl phthalate, ethyl cinnamate, methyl oleate, tricresyl phosphate, trimethyl phosphate, tributyl phosphate and trioctyl adipate. Persons skilled in the art will be able to select the type and requisite combination of properties needed in the plasticizer to modify the binder resin. Preferred plasticizers include liquid phthalate plasticizers such as dioctyl phthalate, diethyl phthalate, butyl benzyl phthalate (SANTICIZER™ 160), benzyl phthalate, and octyl benzyl phthalate (SANTICIZER™ 261).

Preferably, the plasticizer is included in the liquid composition at about 0 to 50 parts by weight, depending upon the nature of the resin binder and the desired toughness, elasticity, and related properties in the dried film. More preferably, the plasticizer is included at about 5 to 30 parts by weight, and most preferably, it is present at about 10 to 20 parts by weight.

The filler component of the composition is useful to increase the strength of the resulting film layer. The filler also decreases the amount of the more expensive binder resin needed in the composition, increases the bulk and weight of the resulting film, and otherwise modifies the physical properties of the film and film forming composition. The major modifications which can be achieved with fillers are changes of color or opacity, changes of density, increase of solids content, change of rheology, increase in stiffness or modulus of the coating, and changes in the affinity of the coating for various adhesives, cements, mortars, and the like. A non-limiting list of useful fillers for the present invention include carbonates, clays, talcs, silicas including fumed silica and amorphous silica, silico-aluminates, aluminum hydrate, oxides (zinc or magnesium), silicates (calcium or magnesium), sand, cement powder, mortar powder, zinc dust, zinc chromates, metallic aluminum, iron pyrites, wood flower, a ground natural or synthetic rubber, and the like. Preferred fillers include magnesium silicate, fumed silica, sand, and cement powder.

Preferably, the filler is included in the liquid composition at about 0 to 200 parts by weight, depending upon the nature of the resin binder and the desired toughness, elasticity, and compatibility of the dried film. More preferably, the filler is included at about 50 to 150 parts by weight, and most preferably, it is present at about 60 to 100 parts by weight.

Particulate solids useful in the present invention are iron oxides such as red micaceous iron oxide, white, yellow, green and black. The iron oxides are finely divided powders and flakes. These solids not only impart color to the composition to allow the user to determine coverage of the structure and to render the film coating relatively impervious to UV light, but also provide chemical resistance to the film coating.

Preferably, the particulate solid pigments and opacifying agents are included in the liquid composition at about 1 to 25 parts by weight, and more preferably, they are present at about 1 to 10 parts by weight.

The liquid composition may be prepared by combining the binder resin and organic solvent in a vessel. The resin/solvent combination can then be mixed for about 2 hours. The mixture should be relatively clear to indicate a high level of dissolution of the resin in the solvent. Increasing opacity of the mixture signals a high level of plasticizer or other polymers in the mixture.

Plasticizers, fillers, pigments, etc., can then be added and mixing continued for about 45 minutes or until the liquid mixture appears creamy and all particles within the mixture appear to be uniform when viewed through a falling film of the mixture. Of course, adding mild heat to the mixing vessel will decrease mixing time necessary, and beginning agitation immediately will eliminate the need to allow the resin/solvent combination to rest overnight. However, agitation will generally exceed 30 minutes.

The liquid composition is relatively viscous, preferably passing through a 29/64 inch aperture of a 3 ¼ ounce full radius viscosity cup in about 12–20 seconds at 60° F. and, more preferably, about 18–20 seconds at 60° F., and has a solids content of about 35 to 65 wt-%, and forms a film having an average water vapor permeability of less than about $1*10^{-2}$ perms-inch. More preferably, the solids content is about 40 to 55 wt-%, and the average water vapor permeability is less than about $8*10^{-3}$ perms-inch. Most preferably, the solids content is about 50 wt-%, and the permeability is less than about $6*10^{-3}$ perms-inch.

Application of the Coating Composition

The coating composition can be applied to the exterior or to the interior of a structure. In coating sewage tanks and pipes, the composition is applied on the interior of the below grade structure prior to backfilling.

The liquid coating composition can be applied by rolling, brushing, spraying, spraying and backrolling, etc. Preferably, the coating is applied by transfer pump at about two to three gallons/minute from a container to the surface of the structure followed by rolling or brushing as with standard waterproofing paints. After application, the coating can dry rapidly under average ambient conditions. However, in extreme cold temperatures or high humidity, the drying of the coating can be more prolonged. Generally, under moderate humidity in the shade at about 70° F., a coating having a wet thickness of about 50 mils will dry to a non-tacky, non-fluid state in about 4 hours. Upon drying, the coated composition can be backfilled without damaging the waterproof coating. At the other extreme, under winter conditions of about 25° F. and low humidity, the same coating will dry in about 12 hours (overnight).

Imperfections and damage in the resulting dried coating can be simply repaired by application of additional liquid composition over the area to be repaired. The solvent carrier remelts the underlying coating, and the repaired area dries to form a continuous film. This is in marked contrast to prior art systems and most paints which form layers with repeated applications.

To repair the dried coating from the interior of a structure, a small hole can be drilled through the structure from the inside, and a sufficient amount of the liquid composition to saturate the repair area can be pumped through the hole to the exterior surface of the structure. The liquid composition will remelt the original coating and will reform a continuous waterproof coating over the exterior surface of the structure. After the repair is complete, the drilled hole can be refilled and patched from the interior of the structure.

Filler Composition

The filler composition comprises a polystyrene resin binder and an inorganic filler in an organic solvent. The resin binder and organic solvent may be as discussed above. The inorganic filler is preferably added to the composition as a powder or larger particulate solid. A non-limiting list of useful inorganic fillers for the present invention include portland cement, natural cement, mortar, sand, wood flower, milled or ground rubber, ground cork, and crushed aggregate. The filler composition generally comprises about 100 parts by weight of the resin binder, about 50 to 200 parts by weight of the inorganic filler and sufficient organic solvent to form a paste. In a preferred embodiment, filler composition comprises about 75 to 150 parts by weight of the inorganic filler and about 80 to 250 parts by weight of the organic solvent, and more preferably, the filler comprises about 100 to 120 parts by weight of the inorganic filler and less than about 180 parts by weight of the organic solvent. The filler composition can be applied by trowel, roller, brush, caulk gun, or other processes normally used for applying heavy mastics and slurries. The filler composition has a solids content of at least about 60 wt-% and more preferably about 80 to 90 wt-%.

In coating the filler composition with the coating composition, the organic solvent can remelt the resin binder to form a strong joint between the filler and coating compositions. The filler composition can be coated with the waterproofing/sealing composition essentially immediately or as soon as the filler composition attains a non-tacky state.

EXAMPLES

The following specific examples can be used to further illustrate the invention. These examples are merely illustrative of the invention and do not limit its scope.

Example 1

One gallon of a liquid, chemically resistant coating composition was prepared from the following materials:

| Component | Quantity |
| --- | --- |
| Polystyrene resin (Medium Impact PS-3145)* | 1.88 lbs. |
| Xylene | 4.85 lbs. |
| Chlorinated paraffin (Chlorowax "50" from Chem Central) | 0.25 lbs. |
| Chlorinated rubber (Chlorotex "100" from Horton Earl) | 0.31 lbs. |
| Polybutene rubber (PB-4015 from Rubber Research of Minnesota) | 0.23 lbs. |
| Magnesium silicate (MISTRON from Cyprus Industrial Minerals) | 1.0 lbs. |
| Red Iron Oxide (Bay-Ferrox "130M" from Horton Earl Co.) | 0.27 lbs. |
| Cabosil ™ (fumed, hydrophobic silica' from Horton Earl Co.) | as needed |

*polystrene-butadiene copolymer containing 7–12% butadiene, from Huntington Chemical (General Polymers).

The liquid coating composition was prepared by combining the binder resin and organic solvent in a vessel and allowing the components to rest undisturbed overnight. The next morning, the combination was mixed for about 30 minutes until clear, and the remaining ingredients were added. Agitation continued for about 45 minutes until the liquid mixture appeared creamy. All particles within the mixture appeared to be uniform when viewed through a falling film of the mixture.

In order to test the film coating of the present invention, seven concrete bricks were first coated on all sides with an organic solution of Example 1 and allowed to cure for 24 hours. The coated concrete bricks were then coated a second time with the same solution and allowed to cure for 5 days.

6 of the coated bricks were treated with various chemical agents as described in the following table by immersing a coated brick in a pail containing the agent at ambient temperatures.

TABLE

| Brick No. | Agent | Immersion Time |
| --- | --- | --- |
| 1 | $H_2SO_y$[a] | 2 days |
| 2 | HCl (28%) | 5 days |
| 3 | Pepsin | 7 days |
| 4 | alkaline detergent | 1 month |
| 5 | cooking oils and fat mixtures | 4 days |
| 6 | motor oil and phosporic acid[b] mixture | 4 days |
| 7 | control | — |

[a]specific gravity: 1.4 g/ml
[b]ca 5–7%

None of the 6 bricks showed any degradation other than some slight discoloration from bricks #1 and 3. Visual inspection and thumbnail feel to determine hardness of the film coating showed the treated bricks to be comparable to control.

OBSERVATIONS

The water vapor "permeance", measured in "perms", is the time rate of water vapor transmission through unit area of a flat material induced by a vapor pressure difference between two specific surfaces, under specified temperature and humidity conditions. The thickness of a material is not factored into a measure of "permeance". Thus, the "perms", or the rate of water vapor transfer, is decreased as the specimen thickness is increased.

The water vapor "permeability" is the time rate of water vapor transmission through unit area of flat material of unit thickness induced by unit vapor pressure difference between two specific surfaces, under specific temperature and humidity conditions. "Permeability" is the arithmetic produce of permeance and thickness.

TEST METHODS

The water vapor transmission test was conducted in accordance with ASTM E96-90, "Standard Test Methods for Water Vapor Transmission of Materials." The test was conducted using both the dry-cup and wet-cup methods at conditions of 73 F and 50% RH. Several 2.8" diameter specimens from each sample group were tested. Each specimen was sealed, suing a rubber gasket or wax, in an aluminum water vapor transmission test cup containing dried anhydrous calcium chloride or deionized water. The test assemblies were placed in a Blue M model FR-446PF-2 calibrated environmental chamber, serial number F2-809, with conditions set at 73°+2° F. and 50+2% RH. Weight gain was monitored daily up until steady-state vapor transfer was achieved. The permeance for each specimen was calculated based on computer-generated graphs of the steady-state vapor transfer.

What is claimed is:

1. A waterproofing, chemically resistant coating composition comprising:
    (a) about 150 to 400 parts by weight of an aromatic hydrocarbon solvent based on the weight of a binder resin;
    (b) about 100 parts by weight of a binder resin comprising about 35–95 wt-% polystyrene and a polymer selected from the group consisting of a styrene-butadiene rubber, polybutene rubber, chlorinated rubber, chlorinated sulfonated polyethylene rubber, chlorinated paraffin and mixtures thereof, and
    (c) about 1 to 25 parts by weight of an iron oxide based on the weight of a binder resin.

2. The composition of claim 1, wherein the binder resin comprises a mixture of polystyrene, polybutene rubber, chlorinated rubber and chlorinated paraffin.

3. The composition of claim 1, wherein the polystyrene constitutes about 50–75 wt-% of the binder resin.

4. The composition of claim 1, wherein the aromatic hydrocarbon solvent is xylene or toluene.

5. The composition of claim 1, which further comprises:
   (d) about 5 to 30 parts by weight of a plasticizer based on the weight of binder resin, and
   (e) about 5 to 150 parts by weight of a filler based on the weight of binder resin.

6. A method of waterproofing and sealing a sewage system structural unit comprising the steps of:
   (a) applying to at least one surface of the unit a chemically resistant composition dissolved in an aromatic hydrocarbon solvent wherein said chemically resistant composition comprises:
      (i) about 100 parts by weight of a binder resin comprising about 35–95 wt-% polystyrene and a polymer selected from the group consisting of a styrenebutadiene rubber, polybutene rubber, chlorinated rubber, chlorinated sulfonated polyethylene rubber, chlorinated paraffin and mixtures thereof, and
      (ii) about 1 to 25 parts by weight of an iron oxide based on the weight of binder resin; and
   (b) solidifying the composition of (a) to form a continuous film.

7. The method of claim 6, wherein the binder resin comprises a mixture of polystyrene, polybutene rubber, chlorinated rubber and chlorinated paraffin.

8. The method of claim 6, wherein the polystyrene constitutes about 50–75 wt-% of the binder resin.

9. The composition of claim 6, wherein the aromatic hydrocarbon solvent is xylene or toluene.

10. The composition of claim 6, which further comprises:
    (iii) about 5 to 30 parts by weight of a plasticizer based on the weight of binder resin, and
    (iv) about 5 to 150 parts by weight of a filler based on the weight of binder resin.

* * * * *